United States Patent [19]
Takai et al.

[11] Patent Number: 5,870,090
[45] Date of Patent: Feb. 9, 1999

[54] SYSTEM FOR FACILITATING SELECTION AND SEARCHING FOR OBJECT FILES IN A GRAPHICAL WINDOW COMPUTER ENVIRONMENT

[75] Inventors: Yasuyuki Takai, Shiki-gun; Kiyoshi Kakuda, Nara, both of Japan

[73] Assignee: Sharp Kabushiki Kaisha, Osaka, Japan

[21] Appl. No.: 727,981

[22] Filed: Oct. 10, 1996

[30] Foreign Application Priority Data

Oct. 11, 1995 [JP] Japan ................................. 7-263380

[51] Int. Cl.⁶ ........................................................ G06F 3/14
[52] U.S. Cl. ........................ 345/340; 345/342; 345/339; 345/348
[58] Field of Search .................................. 345/340, 342, 345/343, 344, 345, 351

[56] References Cited

U.S. PATENT DOCUMENTS 5,227,771  7/1993  Kerr et al. ............................... 345/348
5,237,653  8/1993  Noguchi et al. ......................... 345/345
5,550,969  8/1996  Torres et al. ............................. 345/340
5,561,753  10/1996  Coulombe et al. ..................... 345/326

FOREIGN PATENT DOCUMENTS 5-224870  9/1993  Japan .
5-252493  9/1993  Japan .

Primary Examiner—Raymond J. Bayerl
Assistant Examiner—Chadwick A. Jackson
Attorney, Agent, or Firm—Nixon & Vanderhye, P.C.

[57] ABSTRACT

A method for allowing a user to search for a file includes: a first step of, in response to an enlargement in the size of a window, enlarging a range for searching for a plurality of files displayable in the window; and a second step of, in response to a reduction in the size of a window, reducing the range for searching for the plurality of files displayable in the window.

5 Claims, 12 Drawing Sheets

Window icon data

| | | |
|---|---|---|
| | A | Data attribute |
| | Window icon data No. | 000 to 999 (e.g.,003) |
| K | Window name | Name area (20 letters) (e.g.,MAIN) |
| H | Window icon data No. | (e.g.,004) |
| | Window name | (e.g.,PROGRAM MANAGER) |

FIG. 3B

Executable icon data

| | | |
|---|---|---|
| | B | Data attribute |
| H | Window icon data No. | (e.g.,003) |
| L | Executable icon data No.1 | Data No.001 to 999 |
| | Executable icon name | (e.g.,SETUP) |
| | Importance value N | Represents importance in display |
| | Executable icon display data | |
| | Excution address | |
| J | Executable icon data No.2 | Data No.002 |
| | Executable icon name | |
| | Importance value N | Represents importance in display |
| | Executable icon display data | |
| | Excution address | |

FIG. 4A

Device icon data

| C |
|---|
| Executable icon data No.2 |
| Device icon data No. |
| Device icon name |
| Importance value N |
| Device icon display data |
| Device icon execution address |
| Device icon data No. |
| Device icon name |
| Importance value N |
| Device icon display data |
| Device icon execution address |

Data attribute
(e.g.,003)
Data No.001 to 999
(e.g.,MOUSE)
Represents importance in display Data No.002
(e.g.,KEYBOARD)
Represents importance in display

FIG. 4B

Window data

A window database is constructed from the following data

|  | D |
|---|---|
|  | Window No. |
| K | Window name |
|  | Window icon data No. |
| J | Executable icon data No.2 |
| L | Executable icon data No.1 |
|  | Executable icon data No.3 |

Data attribute
(e.g.,0001)
(e.g.,MAIN)

FIG.11A 
354 MAIN

SYSTEM FOR FACILITATING SELECTION AND SEARCHING FOR OBJECT FILES IN A GRAPHICAL WINDOW COMPUTER ENVIRONMENT

BACKGROUND OF THE INVENTION

1. Field of the Invention

The present invention relates to an information processing system such as a computer system.

2. Description of the Related Art

A computer system as an information processing apparatus is constructed so as to allow a user to create texts, tables, and the like. The user typically searches for and chooses one of a number of programs provided in the computer system to create such data.

However, in conventional information processing apparatuses such as computer systems, file names (including program file names and data file names) are displayed in a small and uniform size, making it difficult for the user to search for and choose among a number of such file names.

SUMMARY OF THE INVENTION

A method for allowing a user to search for a file according to the present invention includes: a first step of, in response to an enlargement in the size of a window, enlarging a range for searching for a plurality of files displayable in the window; and a second step of, in response to a reduction in the size of a window, reducing the range for searching for the plurality of files displayable in the window.

In one embodiment of the invention, the plurality of files have levels of priority for being displayed in the window, and the method further includes a step of displaying those of the plurality of files whose level of priority is equal to or higher than a designated level of priority.

In another embodiment of the invention, the plurality of files are icons, and the first step includes: a step of selecting one of the plurality of icons and zooming into the selected icon wherein the zoomed-in icon opens as a window when the zoomed-in icon reaches a predetermined size.

In still another embodiment of the invention, the second step includes a step of zooming out from the window, wherein the zoomed-out window is changed to an icon when the zoomed-out window reaches a predetermined size.

In still another embodiment of the invention, the first step includes a step of, in cases where the window and a further window are both displayed in a displayed image, reducing the further window so as not to overlap with the window.

In still another embodiment of the invention, the plurality of files have levels of priority for being displayed in the window, and the step of opening the zoomed-in icon as a window includes a step of displaying those of the plurality of files whose level of priority is equal to or higher than a designated level of priority.

Thus, the invention described herein makes possible the advantage of providing an information processing apparatus for enabling a user to choose among a number of files (including program files and/or data files) that are displayed.

This and other advantages of the present invention will become apparent to those skilled in the art upon reading and understanding the following detailed description with reference to the accompanying figures.

DESCRIPTION OF THE PREFERRED EMBODIMENTS

Figure 1:
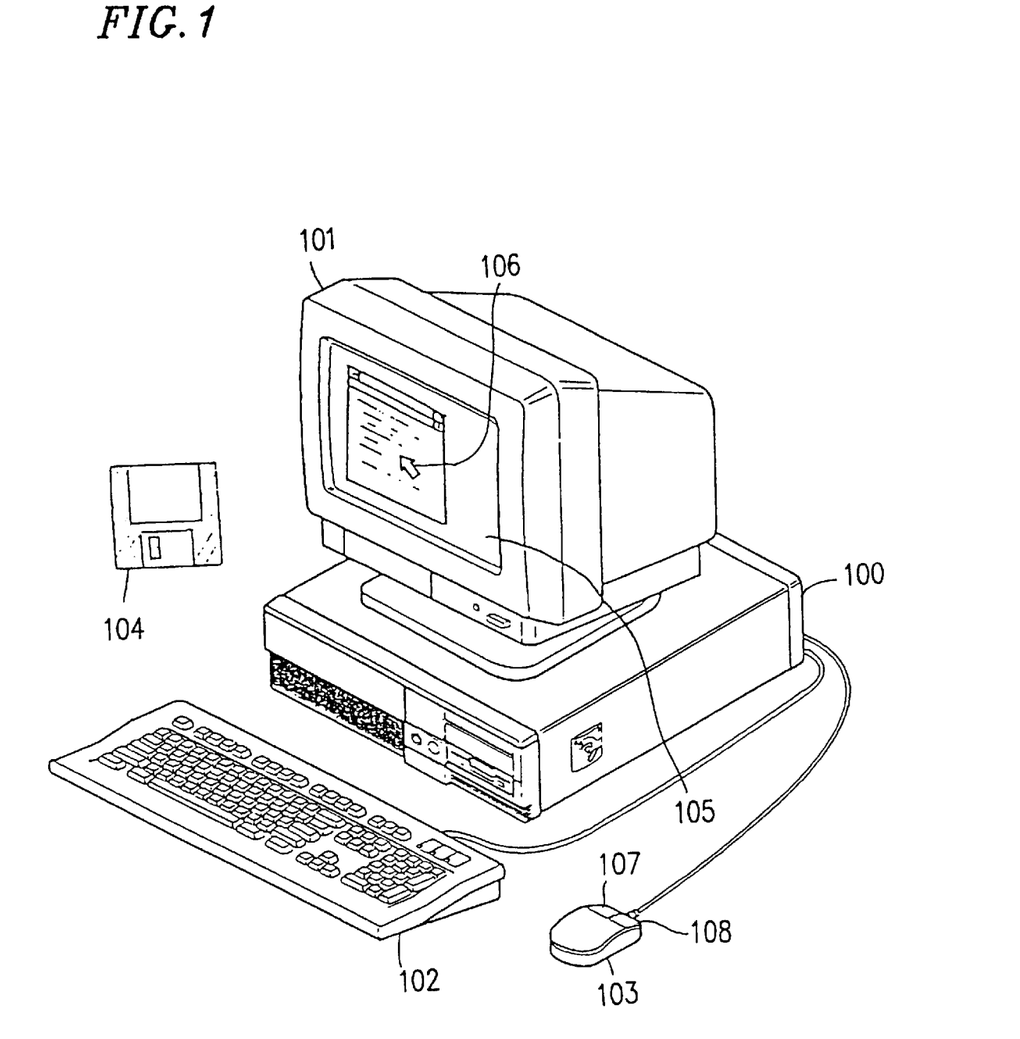
FIG. 1 is a perspective view showing an outlook of a computer system according to the present invention.

FIG. 1 is a perspective view showing an example of a computer system (as an information processing apparatus) according to the present invention. The computer system includes a data processing device 100, a display device 101 having a displayed image 105, a key-board 102 as an input device for inputting data and commands, a mouse 103 as a pointing device for zooming, moving a cursor, clicking, dragging, etc., and a storage medium 104 for storing various data. The mouse 103 at least includes buttons such as a left button 107 and a right button 108.

In the displayed image 105 is displayed a cursor 106 as an image pointer for pointing to an object in a displayed image (e.g., a "window") and/or a position in a displayed image. A program included in the data processing device 100 controls the cursor 106 so as to move in a certain restricted area within the displayed image 105 in accordance with inputs made via the mouse 103.

Figure 2:
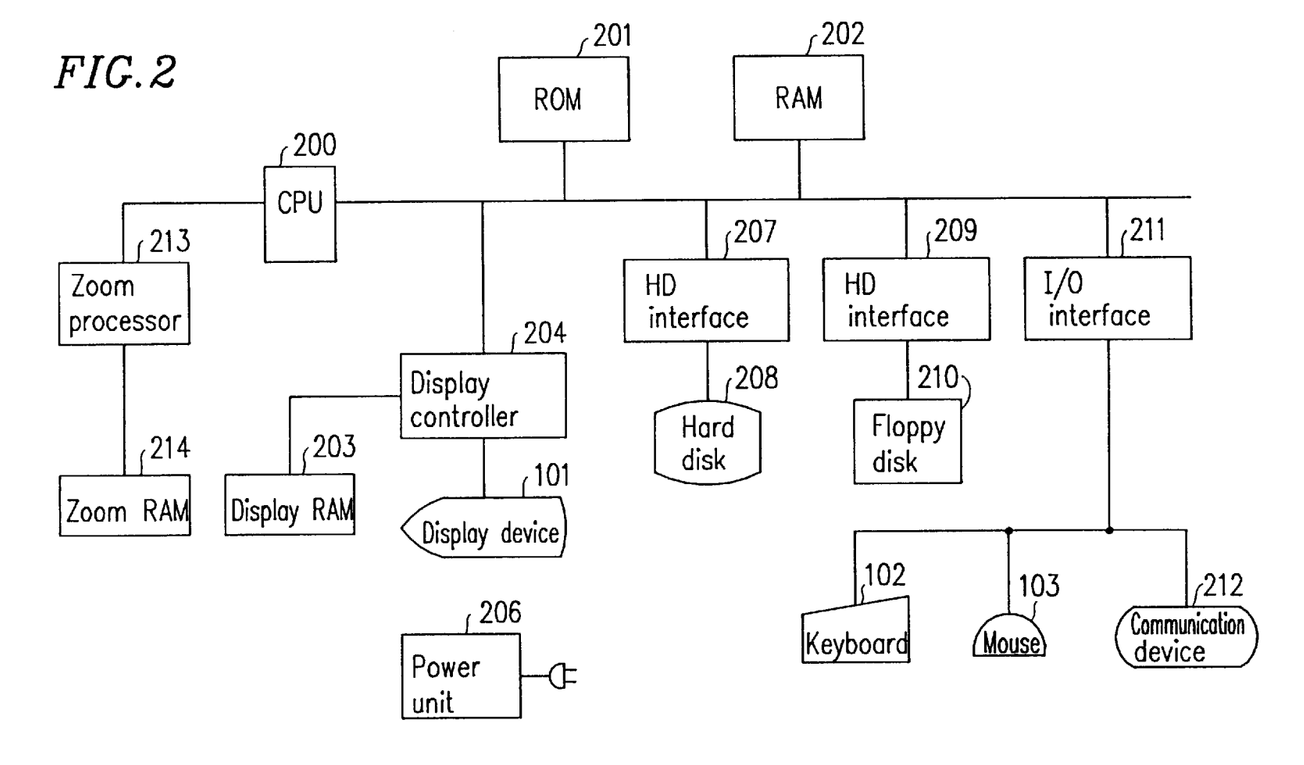
FIG. 2 is a block diagram showing an exemplary configuration of a computer system according to the present invention.

FIG. 2 is a block diagram showing an exemplary architecture of the computer system of the present invention. The computer system includes: a CPU 200 for the computation and control of data; a ROM (read only memory) 201 for storing a program(s) for operating the CPU 200; a RAM 202 for temporarily storing data from storage devices and input devices, e.g., the keyboard 102 and storing programs and/or data that are necessary for the computation and control by the CPU 200; a display controller 204 for displaying images, e.g., windows and a cursor (hereinafter referred to as "display images"), on the display device 101, rearranging data, and/or controlling control signals; a display RAM 203 for storing data of display images to be represented on the display device 101 by the display controller 204, a hard disk 208 for storing application programs and programs for controlling display images (e.g., windows); a hard disk interface 207 for coupling the hard disk 208 to the CPU 200; a floppy disk 210 as a storage device for writing data, programs, etc., in the storage medium 104; a floppy disk interface 209 for coupling the floppy disk 210 to the CPU 200; an I/O (input/output) interface 211 for coupling the keyboard. 102, the mouse 103, and a communication device 212 to the CPU 200; a zoom RAM 214 for storing a program for zooming processes (described later); a zoom processor 213 for performing the zooming processes; and a power unit 206.

The zoom RAM 214 at least includes programs for performing the respective processes described in the following Examples 1 to 3 of the invention. In the case where the display device 101 displays images in color, the zoom processor 213 also controls the color adjustment required in changing each dot of an image during zooming. The communication device 212 is a device to be connected to a modem, a LAN (Local Area Network), etc., in order to communicate with external information processing apparatuses. The communication device 212 can be, for example, a device complying with the RS-232C standards.

Figure 3A:
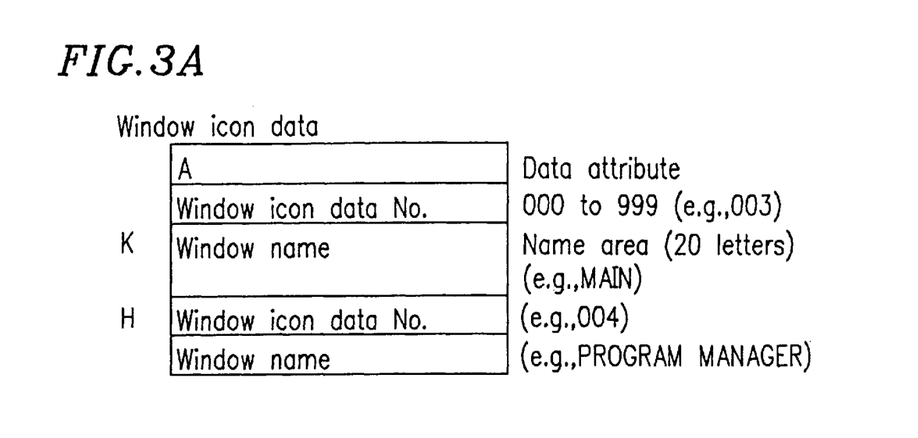
FIG. 3A shows the structure of window data stored in a hard disk of a computer system according to an example of the present invention
Figure 3B:
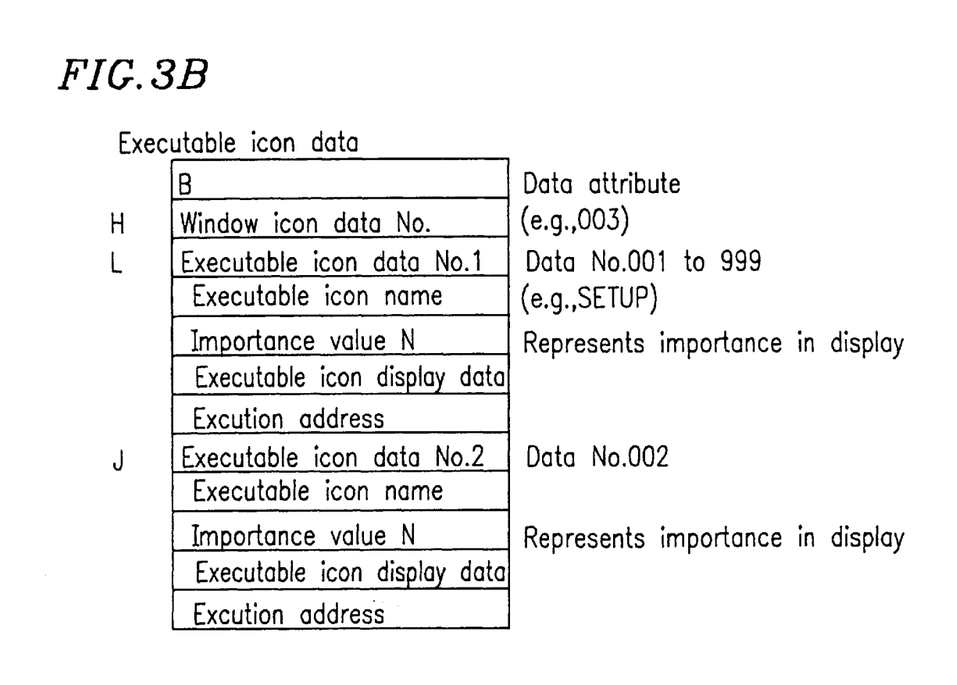
FIG. 3B shows the structure of executable icon data stored in a hard disk of a computer system according to an example of the present invention.
Figure 4A:
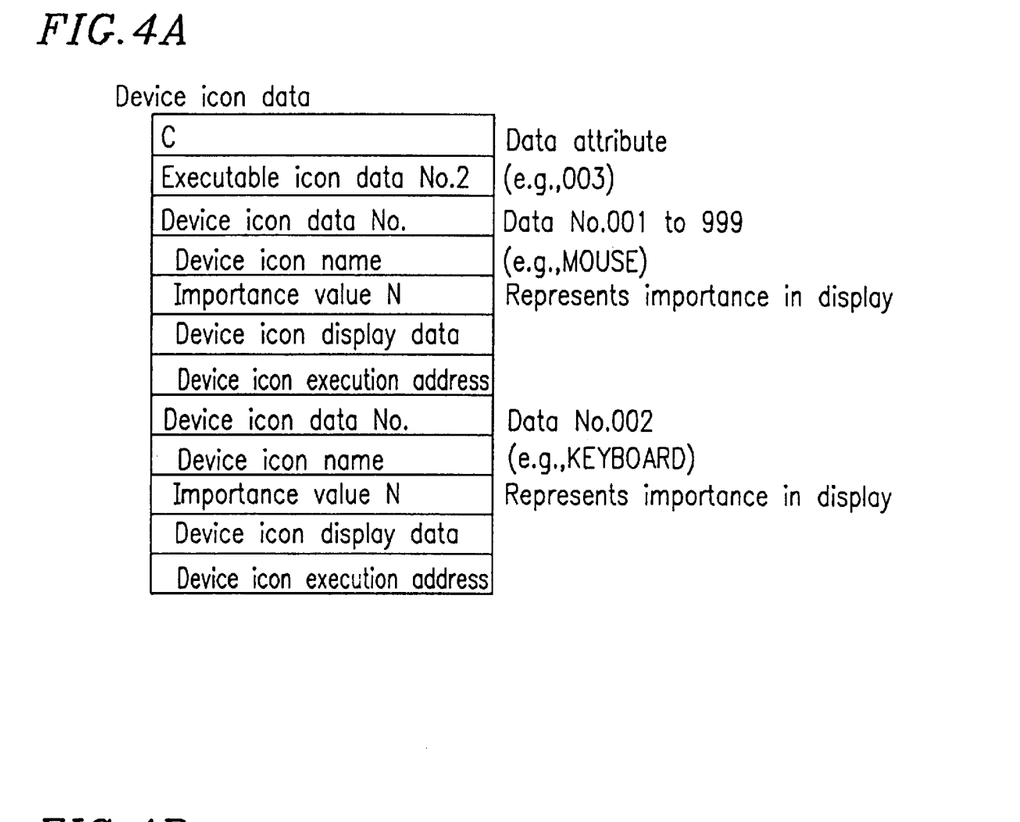
FIG. 4A shows the structure of device icon data stored in a hard disk of a computer system according to an example of the present invention.
Figure 4B:
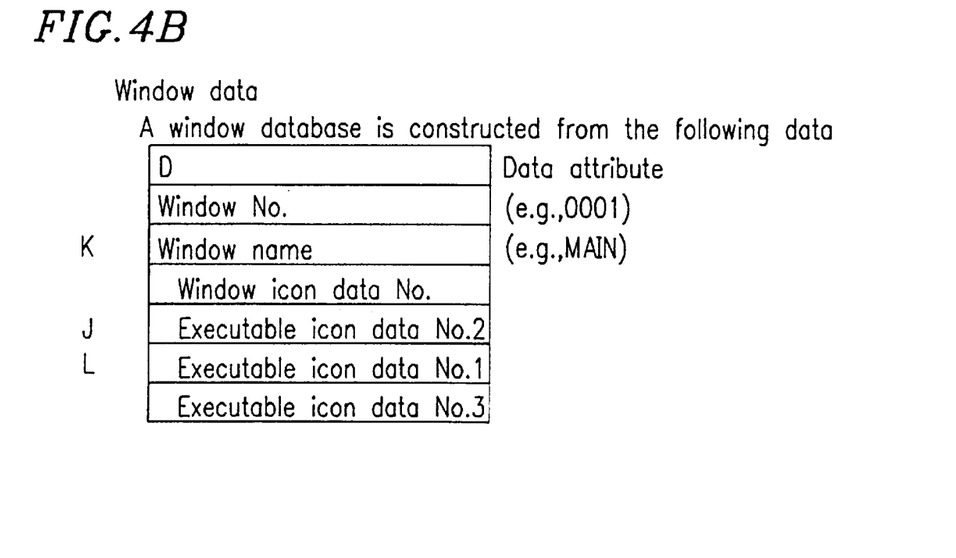
FIG. 4B shows the structure of window data stored in a hard disk of a computer system according to an example of the present invention.

FIGS. 3A and 3B and FIGS. 4A and 4B illustrate the structure and kinds of data stored in the hard disk 208. FIG. 3A shows window data. FIG. 3B shows executable icon data. FIG. 4A shows device icon data. FIG. 4B shows window data.

The window data includes the name and an ID number (indicating the internal system name) of each window. The executable icon data shows the data concerning each executable icon to be displayed in a window.

The executable icon data includes: the ID number of a window in which each executable icon is displayed; the name of the executable icon; an importance value (described later) of the executable icon; display data of the executable icon; and an execution address of the executable icon when it is executed.

The executable icon data can include data (e.g., name, importance value, and display data) concerning non-executable icons, such as text icons. The executable icon data of a non-executable icon does not include an execution address.

Table 1 illustrates the relationship between the above-mentioned data and the zooming processes described later.

TABLE 1

| Zoom size | Window data | Executable icon data |
|---|---|---|
| Icon 354 | Icon and its name | — |
| Smallest window 353 | — | Display icons whose importance value is 1 |

TABLE 1-continued

| Zoom size | Window data | Executable icon data |
|---|---|---|
| Original window 350 | — | Display icons whose importance value is larger |
| Largest window 351 | — | All icons |
| Selected icon 304 opens (as a window 355) when window 352 including the selected icon 304 reaches a predetermined size | — | All icons |

The computer system of the present invention has a zoom mode. Hereinafter, the operation of the computer system in the zoom mode will be described.

In order to perform magnification/reduction (e.g., zooming in/zooming out) using the mouse 103, a user switches between various modes of controlling the mouse 103, e.g., a normal mode and a zoom mode. In order to switch modes, the user depresses a specific combination of keys, which operate in a toggle manner. When the computer system is in the zoom mode, a mode indicator window is displayed within the displayed image to inform the user that it is in the zoom mode.

Figure 5:
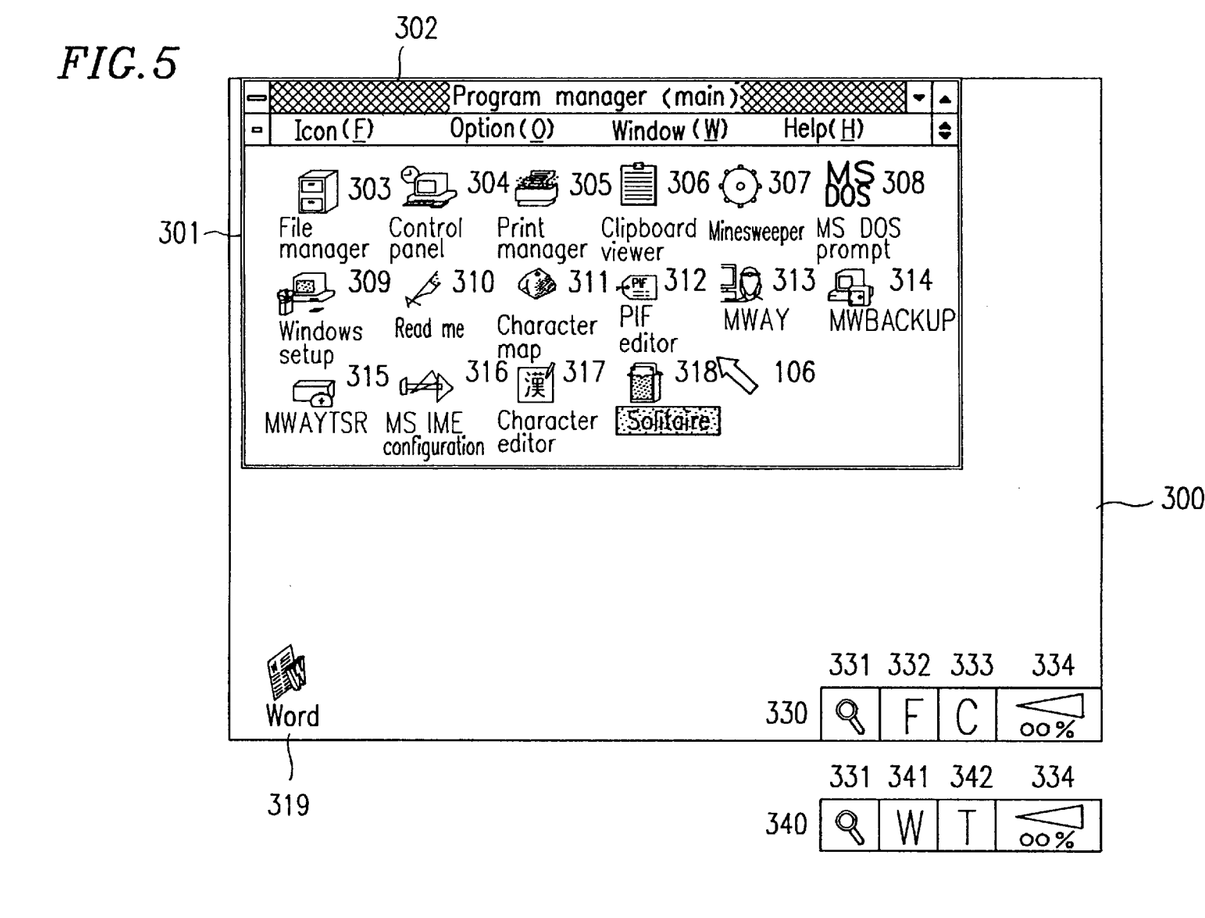
FIG. 5 illustrates a window displayed in a displayed image of a computer system according to an example of the present invention.

FIG. 5 illustrates a window 301 displayed in a displayed image 300. A title of the window 301 is displayed in an upper portion of the window 301. Icons 303 to 318, each of which represents a file or a group of files, are displayed below the title 302. A similar icon 319 is also displayed below the window 301 in the displayed image 300 in the example shown in FIG. 5.

When a user depresses a specific combination of keys (e.g., the "Z" key and the "ALT" key) to place the computer system in one of the two zoom modes described below, the zoom RAM 214, the zoom processor 213, and the CPU 200 cooperate to display a zoom mode indicator window 330 in the bottom right corner of the displayed image 300. The zoom mode indicator window 330 includes an icon 331 indicating that the system is in a zoom mode, an "F" icon 332 indicating a file-search zoom mode in which files are to be searched for, a "C" icon 333 indicating that windows are cascaded over one another, and an icon 334 visually representing the zoom ratio in terms of a numerical figure and a graph.

When the user uses the mouse 103 to move the cursor 106 to the icon 332 and clicks on the icon 332, the mode indicator window 330 changes to another mode indicator window 340.

In the mode indicator window 340, the "F" icon 332 is replaced by a "W" icon 341 indicating a window zoom mode in which a zooming operation for magnifying or reducing windows is to be performed. The icon 333 is replaced by a "T" icon 342 indicating that windows are tiled up. These changes in the icons can be independently made by clicking on the respective icons in the mode indicator window.

EXAMPLE 1

Hereinafter, the present invention will be described by way of examples, with reference to the accompanying figures.

First, an operation of the computer system of the present invention will be described with reference to FIG. 6.

Figure 6:
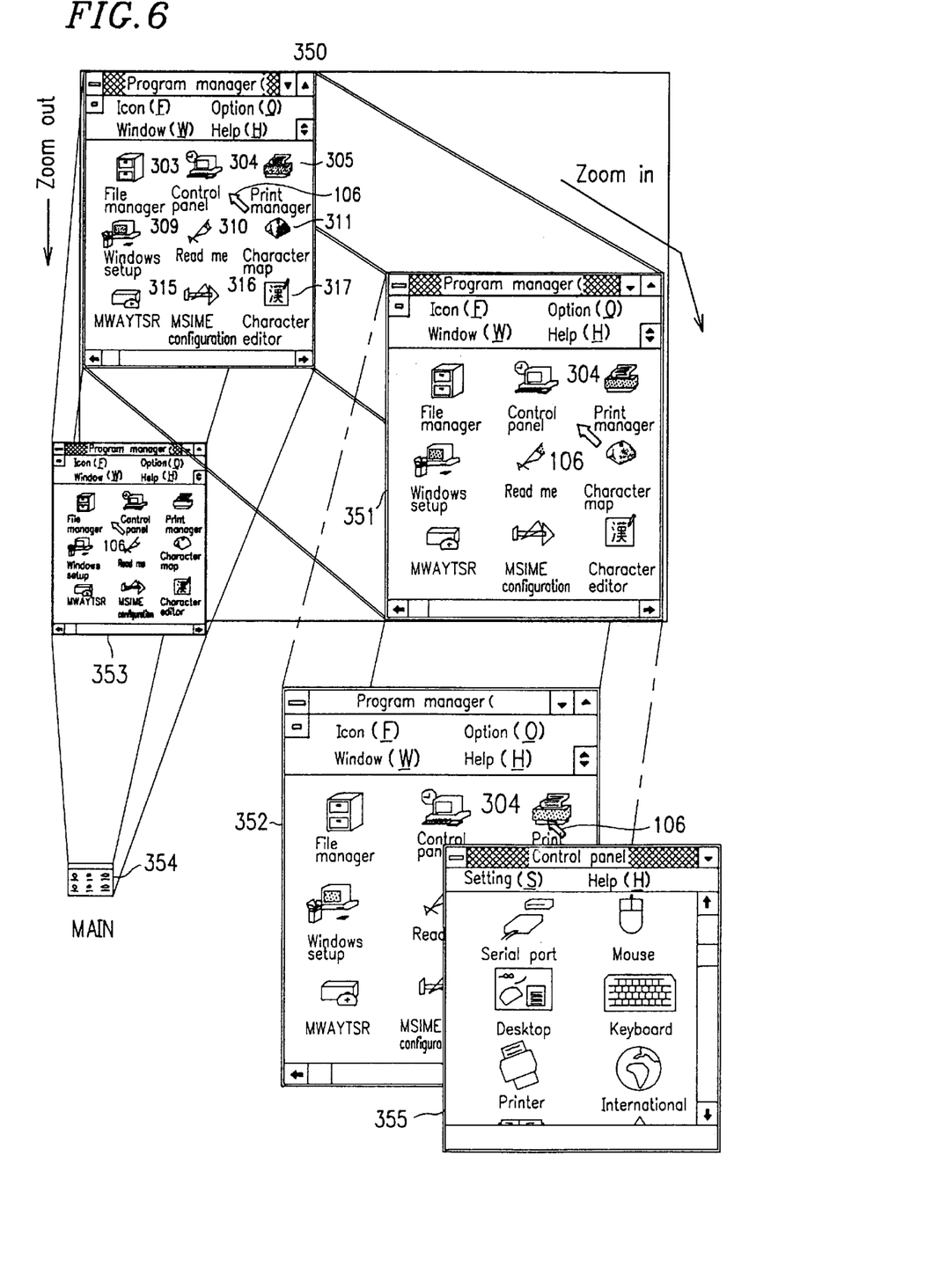
FIG. 6 illustrates a zoom operation of a computer system according to an example of the present invention in the case where the computer system is in a "W" zoom mode.

It is assumed that the computer system originally displays a window 350 in FIG. 6. As shown in FIG. 6, the cursor 106 points to an icon 304.

When the user moves the mouse 103 toward the right while depressing the right button 108 of the mouse 103 in this state, the icon 304 is dragged along. The cursor 106 selects the dragged icon 304 as the dragging begins.

When a drag toward the right is performed while depressing the right button 108 of the mouse 103 in the zoom mode, a window that is pointed to by the cursor 106 is zoomed out so that the entire window is magnified as indicated by 351.

Figure 11A:
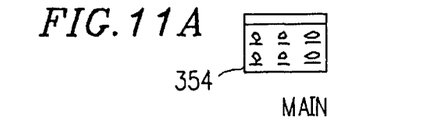
FIG. 11A shows an icon displayed in Mode A.
Figure 11B:
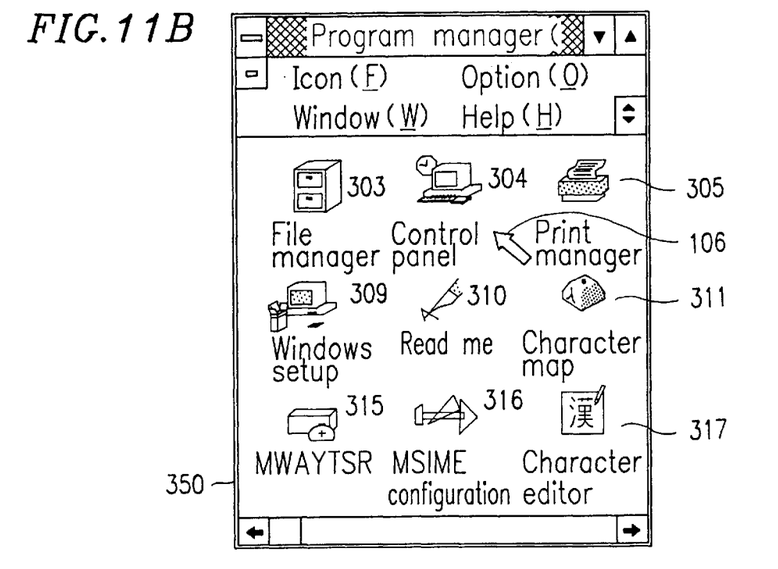
FIG. 11B shows a window and icons displayed in Mode B.
Figure 11C:
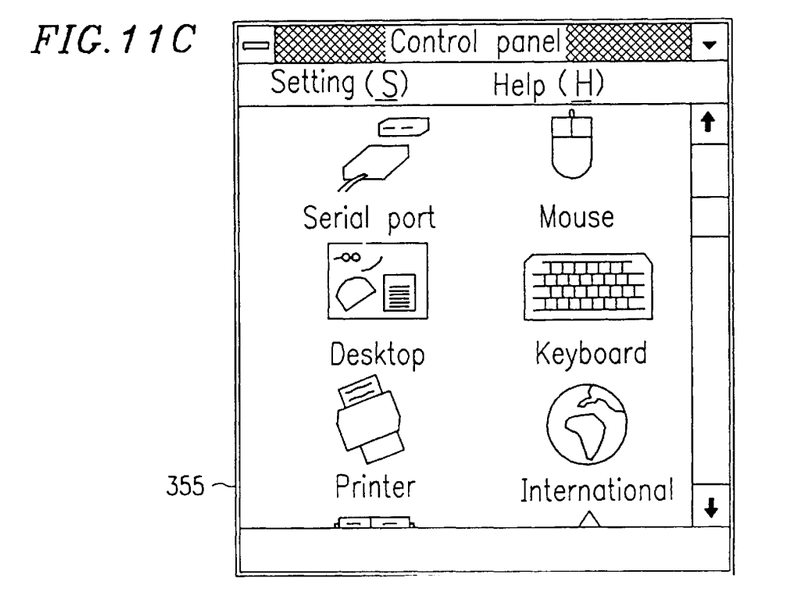
FIG. 11C shows a window and icons displayed in Mode C.

Table 2 shows an exemplary relationship between the magnification/reduction ratio of the window and the windows and icons. FIG. 11A shows the icon in mode A. FIG. 11B shows the window and icons in mode B. FIG. 11C shows the window and icons in mode C, where the zoom ratio of the icons exceeds 170% of the original window.

When the zoom ratio of the icons or the window exceeds 170% of the original window (Mode C), the selected icon 304 is activated so that a new window 355 corresponding to the selected icon 304 opens as shown in FIG. 6. If no icon was selected when the drag began, no such new window 355 opens.

When the zoom ratio of the icons or the window becomes smaller than 30% of the original window (Mode A), the dragged window becomes an icon representing the window.

As used herein, an "original window" has a predetermined size, that is, the original window is set up to a predetermined size.

TABLE 2

| Mode | A | B | C |
| --- | --- | --- | --- |
| Zoom ratio | Under 30% | 100% | Over 170% |
| Window | Becomes an icon | original window | — |
| Icon | — | icon | Open window |

Referring back to FIG. 6, any of icons 303, 305, 309, 310, 311, 315, 316, and 317 in the window 350 before becoming an icon 354 can be selected. However, once the window becomes the icon 354, the icons therein can no longer be selected.

Thus, according to Example 1, a window can be changed to a desired size by setting the zoom ratio, so that any interesting portion can be magnified to facilitate the search and choice of a file.

EXAMPLE 2

Figure 7:
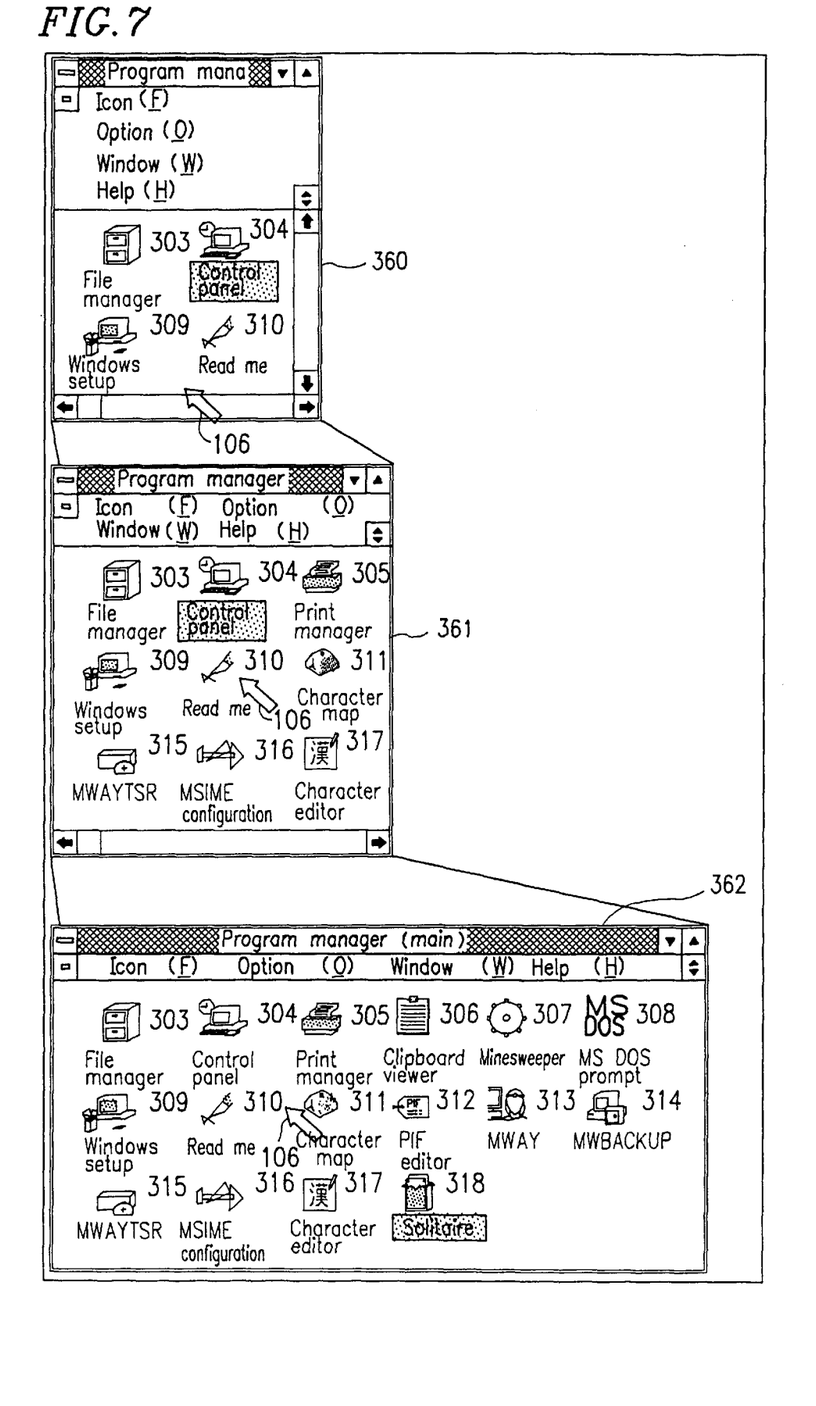
FIG. 7 shows exemplary displayed images illustrating a zoom operation of a computer system according to an example of the present invention in the case where the computer system is in an "F" zoom mode.
Figure 8:
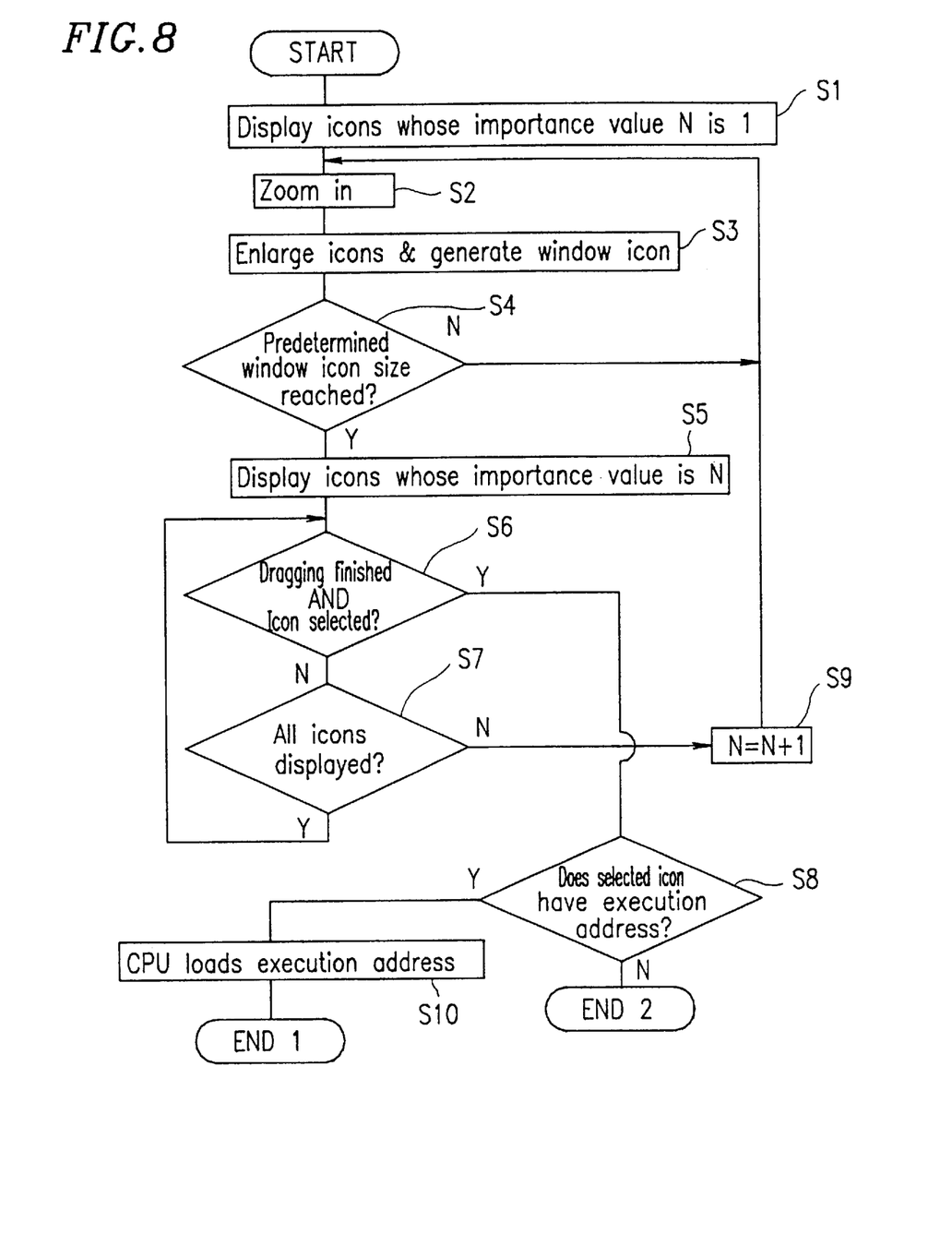
FIG. 8 is a flowchart illustrating the zoom operation of a computer system according to an example of the present invention in the case where the computer system is in the "F" zoom mode.

With reference to FIGS. 7 and 8, a zooming operation in a computer system of Example 2 of the invention will be described. In the exemplary case, a user clicks on the right or left button (108 or 107) of the mouse 103 with the cursor 106 so as to place the computer system in the file-search zoom mode indicated by the "F" (i.e., file search) icon 332.

FIG. 7 illustrates images displayed in the respective stages provided under the zoom mode. FIG. 8 is a flowchart of a search performed with zooming (hereinafter referred to as a "zoom search").

In the case where a CD-ROM stores a large number of files, a large number of icons are likely to be displayed in the same window. Under the conventional window management technique where no priority factors are given to files, all the file icons are displayed in the same window with the same status, thereby making it difficult for a user to search for and choose a desired icon.

In accordance with an information processing apparatus and a method of the present invention using zoom technique, priority factors are assigned to icons. The number of icons to be displayed in a window is adjusted based on the priority factors of the icons and the length along which a mouse is dragged by a user.

FIG. 7 illustrates the changing sizes (360, 361, and 362) of a window and the number of icons to be displayed in the window under the respective sizes, with respect to an exemplary case of the present example. For conciseness, the present example illustrates an exemplary case where the zoom mode has three different stages associated with three levels of priority as exemplified in Table 3.

Table 3 shows the priority levels assigned to the respective icons in the present example. As shown in Table 3, icons 303, 304, 309, and 310 have a priority level A; icons 305, 311, 315, 316, and 317 have a priority level B; icons 306, 307, 308, 312, 313, 314, and 318 have a priority level C.

TABLE 3

| Priority level | A | B | C |
| --- | --- | --- | --- |
| Icon number | 303, 304, 309, and 310 | 305, 311, 315, 316, and 317 | 306, 307, 308, 312, 313, 314, and 318 |

Since the size of a window 360 is relatively small, only those icons whose priority level is A are displayed. A window 361 is enlarged as compared with the window 360, and yet smaller than a window 362 (described below), so that only those icons whose priority level is A or B are displayed. A window 362 is enlarged as compared with the window 361, so that those icons whose priority level is A, B, or C are all displayed.

The priority levels can be set in various manners. In the present example, the computer system counts the frequency of each icon being activated by a user, whereby one of three different priority levels (A, B, or C) corresponding to the frequency of activation is assigned to the icon.

The priority level of each icon may change based on the frequency of how often the icon is selected by a user (i.e., with a mouse). For example, if the icon 305 is selected more often than the icon 303, the priority levels of the icons 303 and 305 can be exchanged. It is also applicable to exchange the positions of the icons 303 and 305 when the system is rebooted.

Now, the information processing apparatus and the method of search according to the present example will be described with reference to FIG. 8.

At step S1, the user inputs the name of a window to be displayed, whereby the CPU 200 reads the window data pertaining to that window. The CPU 200 reads icon data based on the read-out window data. Then, the CPU 200 displays the icons belonging to that window based on the read-out icon data (e.g., executable icon data and device icon data). The window is displayed at a position indicated by the cursor 106 (as designated by a mouse operation). Thus, as shown in FIG. 7, the window 360, along with only those icons whose priority level is A (i.e., those icons having an importance value of 1), is displayed. The priority level increases as the importance value decreases.

The icon display data can be read from the ROM 201. As used herein, "icon display data" refers to data required for displaying an icon.

By dragging the window 360 toward the right while depressing the right button 108 of the mouse 103 so as to zoom in (step S2), the enlarged window 361 is generated (step S3) having just enough area for displaying the 4 icons whose priority level is A and the 5 icons whose priority level is B therein.

The zoomed size of the window is in proportion with the distance along which the user dragged the mouse.

At step S4, the CPU 200 determines whether or not the window 361 has reached a predetermined size by calculating the area of the window 361. If the window 361 has reached the predetermined size, the process proceeds to step S5. If the window 361 has not reached the predetermined size, the process returns to step S2 to repeat the above-mentioned operation.

At step S5, the 4 icons whose priority level is A and the 5 icons whose priority level is B are displayed in the window 361.

The above-mentioned icons are displayed by the CPU 200 reading out the icon display data corresponding to those icons (among the icons to be displayed in the window) whose priority value is A or B.

Once the window reaches the predetermined size by the user zooming into the window, the user will stop dragging the window. Therefore, it is determined whether or not the dragging of the window has finished at step S6. If it is determined at step S6 that the dragging of the window has not finished, the process proceeds to step S7.

If it is determined that the dragging of the window has finished, the CPU 200 further determines whether or not any icon is selected at step S6. An icon is "selected" when the right or left button (108 or 107) of the mouse 103 is depressed while the cursor 106 as an image pointer is pointing to the icon.

If it is determined at step S6 that the dragging of the window has finished and an icon is selected, the process proceeds to step S8. If it is determined at step S6 that the dragging of the window has finished but no icon is selected, the process proceeds to step S7.

At step S7, it is determined whether or not all the icons which qualify to be displayed in the window have been displayed.

If all the icons to be displayed in the window have not been displayed, the process proceeds to step S10.

At step S10, the importance value is increased by 1 and the process returns to step S2.

At step S8, the CPU 200 reads, if any, the execution address stored along with the ID number corresponding to the icon which has been determined to be selected at step S6. If there is an execution address stored, the process proceeds to step S9, where the execution address is loaded by the CPU 200 so that the process ends at END1. At END1, a program assigned to the executable icon can be executed.

If no execution address is stored, the process ends at END2.

In the case of a text icon (as opposed to an executable icon), the device icon does not have an execution address so that the process proceeds from step S8 to END 2.

The resolution of priority levels can be increased (i.e., so that there are more levels of priority), whereby an even smoother search for a given program can be attained.

Figure 12:
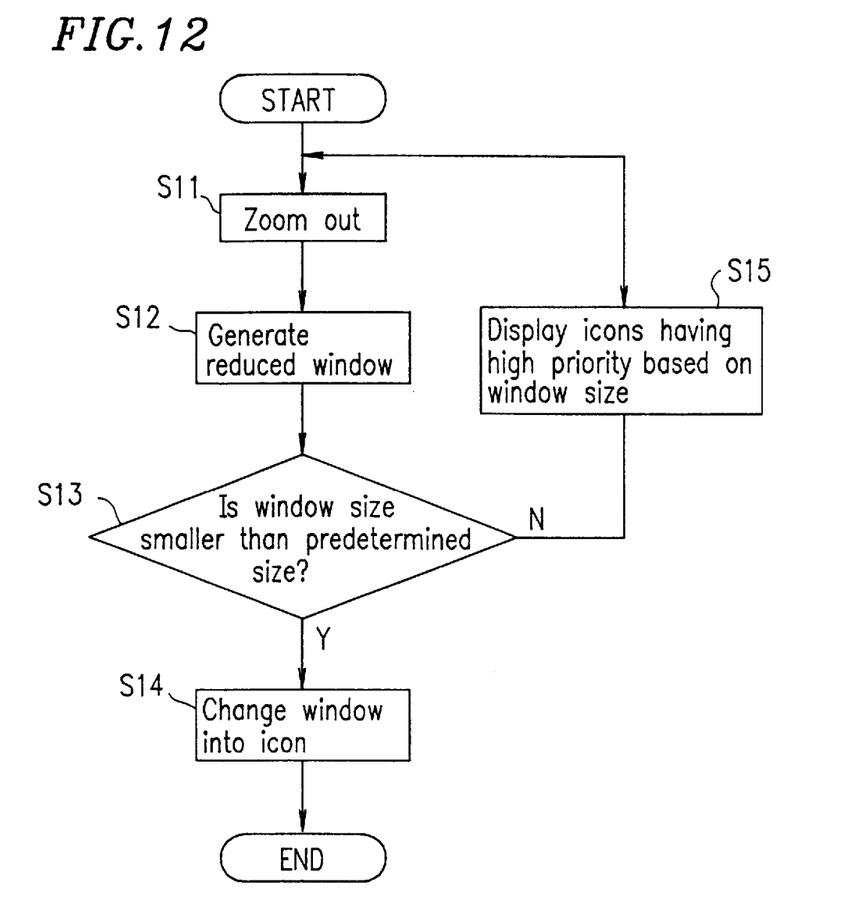
FIG. 12 is a flowchart illustrating an operation of zooming out from a window in accordance with a method of the present invention.

Hereinafter, an operation of zooming out from a window will be described with reference to a flowchart shown in FIG. 12.

At step S11, a user drags a window toward the left while depressing the right button 108 of the mouse 103 to zoom out from the window. At step S12, a reduced window is generated based on the distance along which the mouse 103 has been dragged.

At step S13, the CPU 200 determines whether or not the size of the reduced window is equal to or smaller than a predetermined size. If the size of the reduced window is equal to or smaller than the predetermined size, the process proceeds to step S14, where the reduced window is changed into an icon. If the size of the reduced window is larger than the predetermined size, the process proceeds to step S15.

At step S15, the CPU 200 displays those of the icons belonging to the window which have relatively high priority levels, based on the reduced area of the window.

Although the present example described a case where the right button 108 of the mouse 103 is depressed for dragging a window for zooming-in or zooming-out, it is also possible to configure the computer system so that the left button 107 of the mouse 103 is depressed for dragging a window for zooming-in or zooming-out.

EXAMPLE 3

Figure 9:
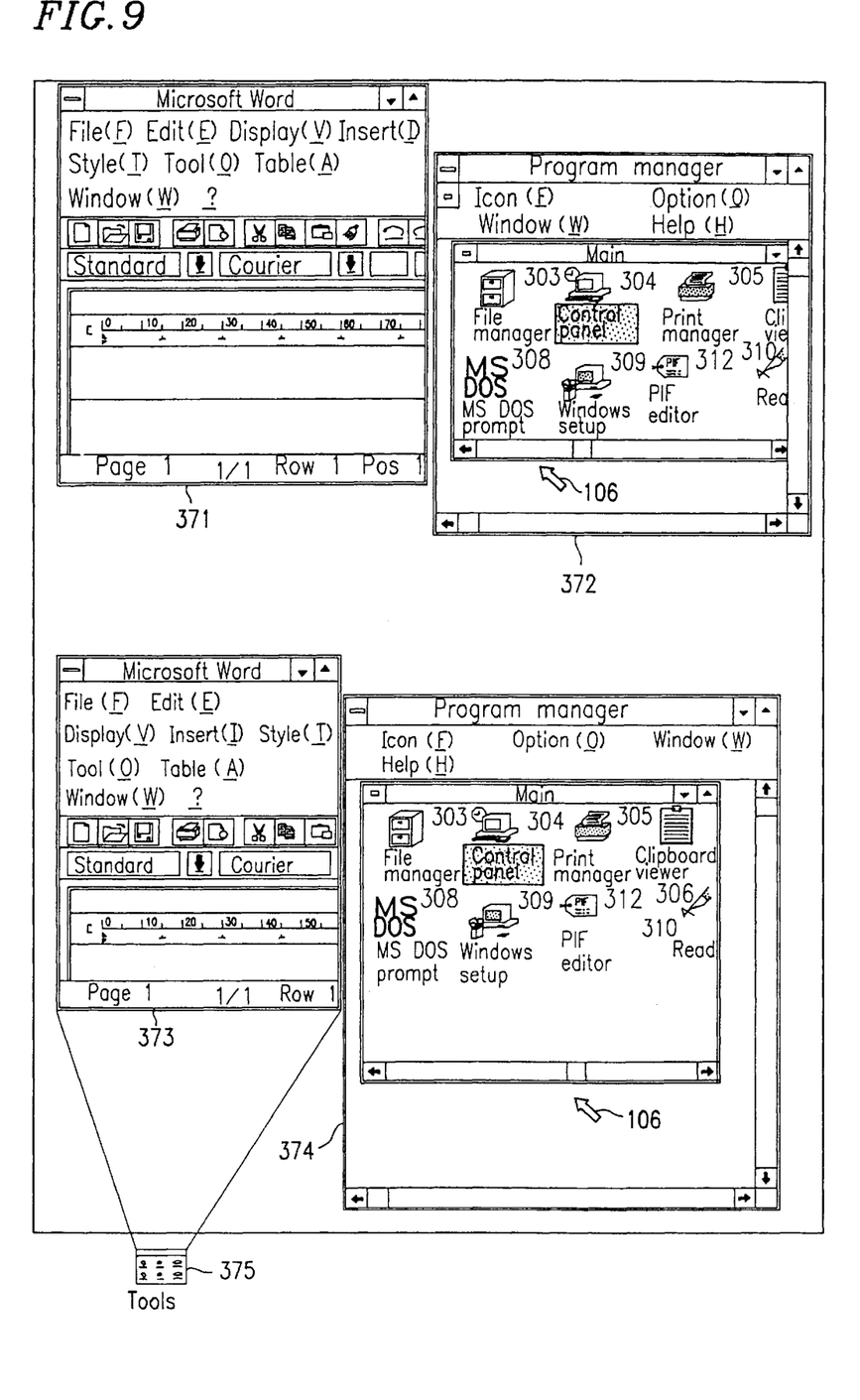
FIG. 9 shows exemplary displayed images of a computer system according to an example of the present invention where a plurality of windows are simultaneously displayed.
Figure 10:
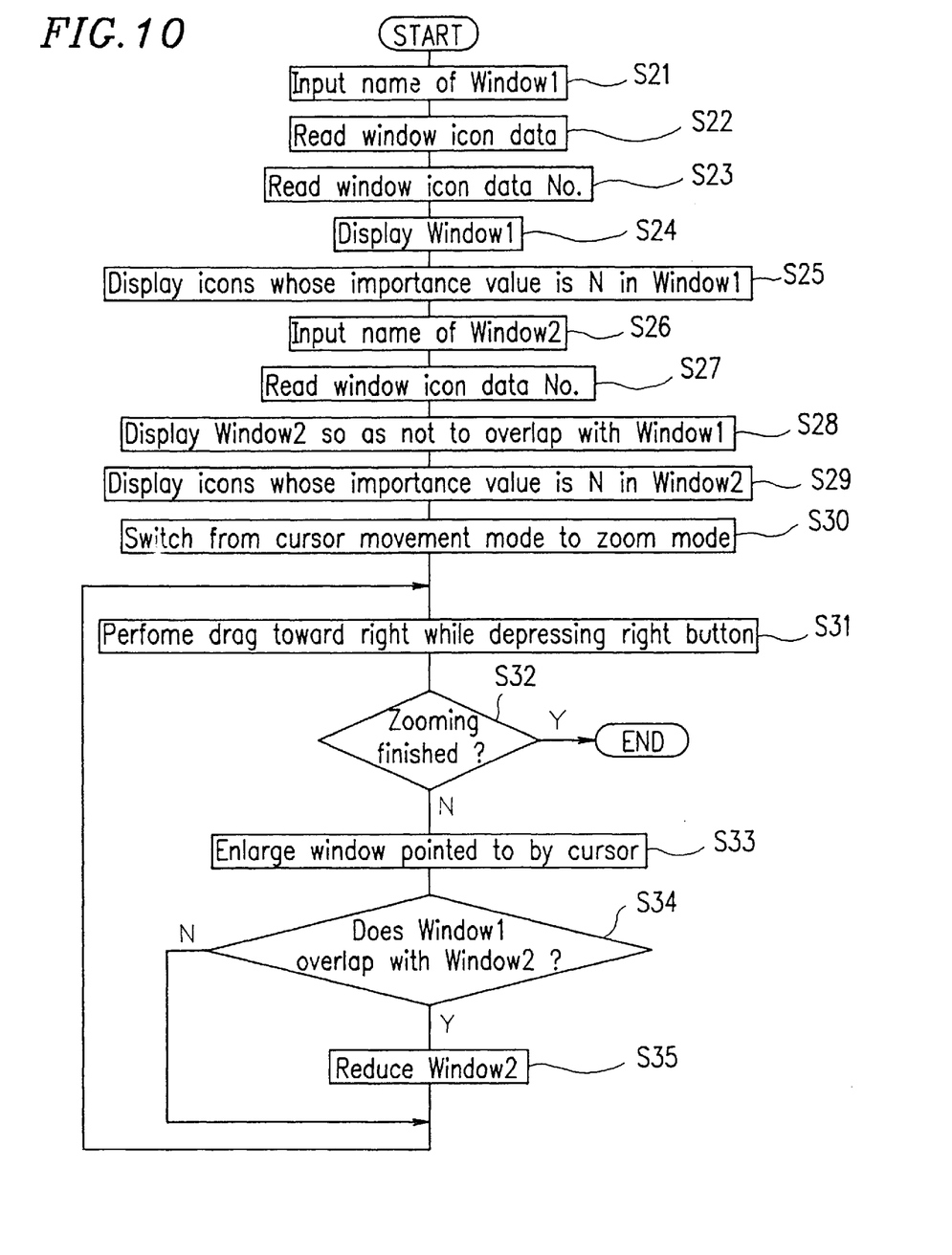
FIG. 10 is a flowchart illustrating the steps of the method of search according to the present example where a plurality of windows are simultaneously displayed.

As one application of the information processing apparatus and the method of search according to the present invention, a case will be described with reference to FIGS. 9 and 10 where a window is enlarged while displaying a plurality of windows at the same time. FIG. 9 is an exemplary displayed image where a plurality of windows are displayed. FIG. 10 is a flowchart illustrating the steps of the method of search according to the present example.

A user manipulates the keyboard to input the name of Window 1 (372) (at step S21). The CPU 200 reads window data from the hard disk (step S22).

The CPU 200 reads an ID number corresponding to the name of Window 1 (372) from the window data (step S23). Display data is read out based on the ID number, whereby Window 1 (372) is displayed (step S24). The display data of the window is stored in the ROM 201. Those icons whose importance value is N or less are displayed in Window 1 (372) (at step S25).

The user manipulates the keyboard to input the name of Window 2 (371) (at step S26). The CPU 200 reads window data from the hard disk (step S27).

The CPU 200 reads an ID number corresponding to the name of Window 2 (371) from the window data. Display data is read out based on the ID number, whereby Window 2 (371) is displayed in a position where Window 2 (371) does not overlap with Window 1 (372)(step S28). The display data of the window is stored in the ROM 201. Those icons whose importance value is N or less are displayed in Window 2 (371) (at step S29).

Window 1 (372) and Window 2 (371) as displayed in the above process are illustrated in the upper corners of FIG. 9. As seen from FIG. 9, Window 1 (372) and Window 2 (371) are displayed at a short distance from each other, e.g., 1 or 2 dots in the displayed image.

The user, desiring to work in one of Window 1 (372) and Window 2 (371), may move the cursor 106 with the mouse to select Window 1 (372), for example. By pressing a specific combination of keys, the user switches the mode of the cursor 106 from the mode of moving the cursor 106 to the zoom mode (step S30).

Depressing the right button of the mouse toward the right, the user drags and thereby zooms into e.g., Window 1 (372), whereby Window 1 (374) is redisplayed (step S31). The zoom size is in proportion to the distance along which the mouse has been dragged.

The CPU 200 determines whether or not the zoom-in operation has finished (step S32). If the zoom-in operation has not finished, the process proceeds to step S33 so that the window pointed to by the cursor 106, e.g., Window 1 (372), is further enlarged.

The CPU 200 determines whether or not Window 1 (374) overlaps with Window 2 (371) (step S34). If Window 1 (374) overlaps with Window 2 (371), the CPU 200 reduces Window 2 (371) so that Window 1 (374) does not overlap with Window 2 (373) (at step S35).

The process from steps S31 to S35 can be performed until Window 1 reaches a predetermined size. The user will stop the mouse operation once Window 1 reaches the predetermined size.

In the above-illustrated case, Window 2 (373) is changed into an icon 375 when Window 1 (374) has become the size of the entire displayed image, the icon 375 being located by the side of Window 1 further enlarged from the state indicated as 374.

The method of the present invention provides the following advantages in the case where a plurality of windows are displayed at the same time.

In a conventional window system, the windows 371 and 372, originally displayed side by side with an interspace of e.g., 1 or 2 dots therebetween, may result in the enlarged window 374 overlapping with part of the window 371. If the window 372 is zoomed into a relatively large size, the enlarged window 372 may completely override the window 371, thereby concealing the window 371 from the user.

On the other hand, according to the present invention, in response to zooming into (and therefore enlarging) the original window 372, the other window 371 is automatically reduced while maintaining the relative locations with respect to the window 372, as illustrated by the windows 373 and 374 shown in the lower corners of FIG. 9. In other words, if Window 1 (372) and Window 2 (371) overlap with each other even slightly, the CPU 200 determines the overlapping therebetween at step S34 and reduces Window 2 (371) accordingly.

As the user continues zooming into the window 374 to further enlarge the area of the window 374, the window 373 is changed into the icon 375 when the window 374 has become the size of the entire displayed image, the icon 375 being located by the side of the window which has been further enlarged from the state indicated as 374. Thus, the size of the unselected window can also be changed in response to the change in size of the selected window.

The icons to be displayed in the window can vary based on the window size, as in Example 2

Although the search operation described in each of the above Examples begins by inputting the name of a given window, the given window can be selected simply by a click on the right or left button of the mouse.

Although computer systems are illustrated in the above descriptions of the present invention, the present invention is also applicable to general information processing apparatuses, e.g., word processors.

Thus, according to the present invention, an information processing apparatus is provided which facilitates the search for a given program.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. In a computer system having a graphical user interface, a method for allowing a user to search for a file, where each file is designated by a file icon and has one of a plurality of priority levels, the method comprising:

a first step of displaying a window showing a first group of file icons, where the icons designate files having at least a first priority level, where the displayed first group is representative of a first range of files to be searched;

a second step of, in response to a command for enlargement in the size of the window, enlarging the window by at least a predetermined threshold amount to expand the range for searching for a plurality of files displayed by icons in the window, where the enlarged window displays the first group of file icons and all of a second group of file icons designating files having a lower priority level than the first priority level, where the displayed second group is representative of a second range of files to be searched; and a third step of, in response to a command to reduce the size of the window, reducing the window to narrow the range for searching for the plurality of files displayed by icons in the window, where the reduced window displays a third group of file icons designating only files having a priority greater than the first priority level, and the displayed third group is representative of a third range of files to be searched.

2. A method according to claim 1, wherein the first step includes:

a step of selecting one of the plurality of file icons and zooming into the selected file icon, wherein the selected file icon opens as a second window of the second step, when the enlarged window reaches a predetermined threshold amount.

3. A method according to claim 1, wherein the third step includes a step of zooming out from the window, wherein the zoomed-out window is changed to an icon when the zoomed-out window reaches a predetermined size.

4. A method according to claim 1, wherein the second step includes a step of, in cases where the window and a further window are both displayed in a displayed image, reducing the further window so as not to overlap with the window.

5. A method according to claim 2, wherein the second window includes a second plurality of file icons which have levels of priority for being displayed in the second window, and the step of opening the selected file icon as the second window includes a step of displaying those of the second plurality of files whose level of priority is equal to or higher than a designated level of priority.

* * * * *